Inventor:
Neal N. Plourde.
by Roland C. Lehman
Attorney.

Oct. 26, 1954        N. N. PLOURDE        2,692,404
METHOD AND APPARATUS FOR FORMING CAPSULES
Filed Dec. 7, 1949                         2 Sheets-Sheet 2
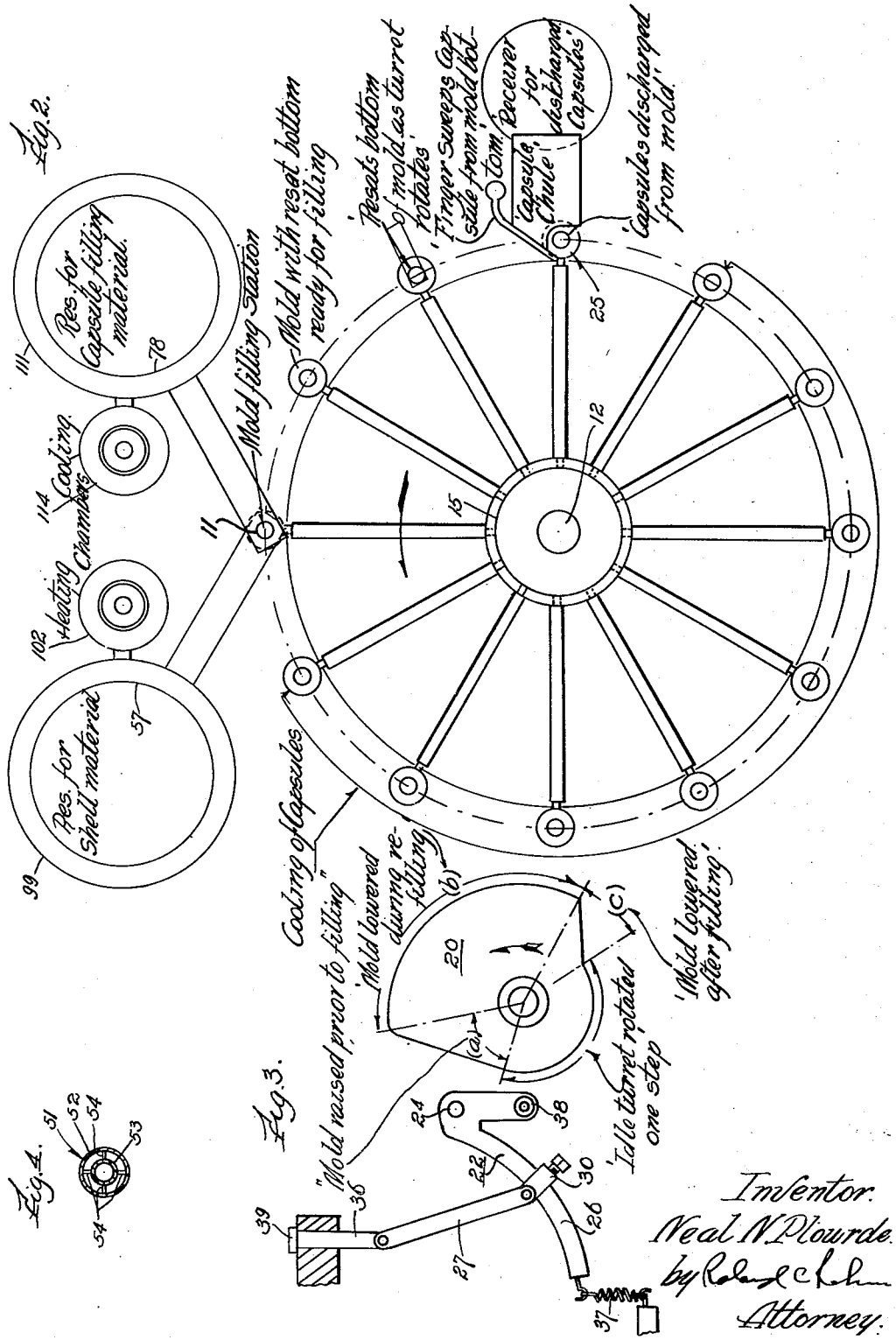

Patented Oct. 26, 1954

2,692,404

UNITED STATES PATENT OFFICE 2,692,404

METHOD AND APPARATUS FOR FORMING CAPSULES

Neal N. Plourde, Detroit, Mich., assignor to Gunnell Capsulations, Inc., Van Dyke, Mich., a corporation of Michigan Application December 7, 1949, Serial No. 131,565

9 Claims. (Cl. 18—5)

1

This invention relates to the manufacture of seamless molded capsules comprising a content or filling substance enclosed by a seamless shell or covering of a thermoplastic or thermosetting material. Edible capsules, including those containing medicaments, are generally enclosed in gelatin, which is one example of a thermoplastic material. For convenience, the term "gelatin" will be used in a generic sense to designate the shell material.

According to the present invention the capsules are formed by injecting into a mold the shell forming and content materials, with the latter surrounded by the former, and after the required charge of content material has been introduced, cutting off the latter while momentarily continuing the flow of the shell material so as completely to cover the top of the content material. The mold is preferably adjusted to a temperature which results in quick setting of the shell material. In the case of a gelatin shell, the mold is cooled to harden the gelatin. In some cases, notably non-edible capsules comprising a thermosetting shell material, the mold would preferably be heated to accelerate setting.

The charges of shell and content materials are adjusted to the desired size of the capsule and the mold employed is formed to give the capsule the desired shape. After the shell material has set sufficiently to permit handling, the capsule is discharged from the mold.

The nature of the invention and further details thereof may be readily understood by reference to one illustrative method and apparatus for producing capsules hereinafter described and illustrated in the accompanying drawings.

In said drawings:

Fig. 2 is a plan diagram of the apparatus of Fig. 1 illustrating the movement of successive molds from one operation to the next;

Fig. 3 is an elevation of the mold adjusting mechanism; and

Fig. 4 is a section taken on the plane 4—4 of Fig. 1 showing the concentric nozzles for shell and filling material.

Figure 1:
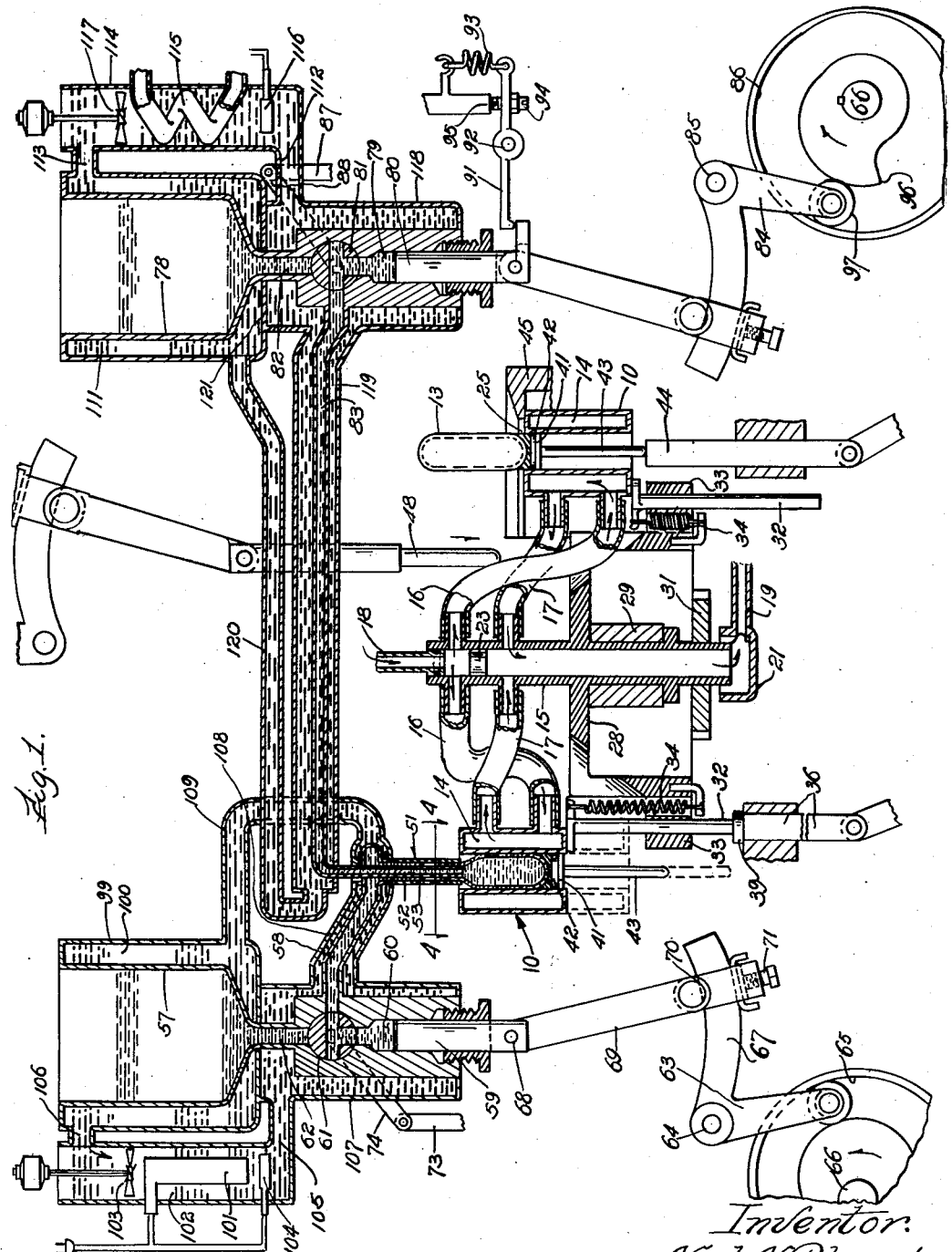
Fig. 1 is a diagram in sectional elevation illustrating the method of manufacture and a rotary or turret apparatus for practicing the method.

The illustrative method and apparatus are designed for the manufacture of capsules with a thermoplastic shell such as gelatin.

In the illustrative method, a series of jacketed molds 10 are presented in succession to a filling station 11 to receive the charge of content material and its enclosing shell. In the present instance, the molds 10 are mounted on a turret or dial and rotate about a vertical axis 12. The turret is representative of means for moving a succession of molds through the successive operations. The number of molds employed depends largely on the diameter of the turret. In the illustrative apparatus twelve molds are employed. The turret is rotated step by step to present successive molds to the filling and successive stations.

In the present instance, the molds are of cylindrical section and are adapted to make a cylindrical capsule 13 rounded at the ends. Each mold comprises an open jacketed cylindrical form in the hollow interior 14 of which temperature controlling fluids are adapted to be circulated. In the present instance, cooling water is circulated through the mold jackets from a hollow turret shaft 15 connected with the several molds by flexible supply pipes 16 and flexible return pipes 17. These permit the molds to be raised and lowered (as presently described) relative to the turret. Temperature controlling fluid is supplied to the hollow interior of the shaft from line 18 entering the top of the shaft, and conducted away by line 19. The latter is provided with a receptacle 21 loosely surrounding the lower end of the shaft for receiving the discharge therefrom (Fig. 1). Intermediate its length and between its supply and return connections 18 and 19, the passage in the shaft is preferably blocked, as at 23, to permit it to serve both as a supply and discharge conduit. In the present instance, the diameter of discharge line 19 is large enough to conduct away discharge from the interior of shaft 15 by gravity, thereby obviating the necessity for a fluid-tight connection between the lower end of the shaft and receptacle 21. Discharge of temperature controlling fluid is preferably into a reservoir provided with means for maintaining the fluid at the desired temperature. In the case of gelatin, the fluid is cooled to a temperature sufficient to congeal the gelatin promptly on introduction into the mold. If the mold be heated, electric heating elements may be employed instead of circulating hot liquid.

Where molds of non-cylindrical section are employed, it is necessary that the molds be made in two parts which are separable to permit the discharge of the molded capsule.

After filling, the molds progressively travel to the discharge position 25 at which point the completed capsule is discharged.

The successive molds are carried on spider arms 28 projecting from shaft 15. The latter is mounted in and supported by bearing 29 and rotated by gear 31 driven periodically by any appropriate driving or "indexing" mechanism. The elevation of the molds relative to the turret is effected by vertically slidable brackets 32 carried in bearings 33 on the turret and biased to move downwardly by spring 34. The molds may advantageously be secured to the brackets. After reaching the filling station, the mold is elevated to filling level (determined by the desired size of the capsule) by an elevating plunger 36 (see Fig. 2).

Any appropriate mold level controlling mechanism may be employed. In the present instance (see Figs. 2 and 3) it functions (a) to elevate the mold to the desired level for filling; (b) to lower the mold during filling; and (c) to lower the mold after filling to a fixed level. The latter movement is preferably relatively quick or sharp to break the stream of shell material at the top of the capsule to avoid drawing it out in a thread. The illustrative mechanism is here shown in the form of a rotary end face cam 20 (Fig. 3) operating an adjustable bell crank 22, fulcrumed at 24. Arm 26 of the bell crank is curved on an arc whose center is the pivot connection of the connecting rod 27 with elevating plunger 36. An adjustable clamp 30 pivoted to the other end of the connecting rod permits variation of the effective length of the bell crank arm 26 without changing the phase of the operating mechanism. Thus the degree of elevation of the mold may be varied. A spring 37 tends to lower plunger 36 and to move cam roller 38 against cam 20. This is limited by the stop 39 on plunger 36, and in the case of an adjustment of arm 26 less than maximum stroke, actually holds cam roller 38 out of contact with the cam for a portion of the cycle. Thus adjustment of movement of the mold to less than its maximum vertical travel is effected by varying the limit of upward movement of the mold. Under all adjustments, the mold is returned to a fixed lower position at the end of the filling operation. Spring 34 moves the mold itself downwardly with plunger 36.

As here shown, the bottom of the mold is closed by a plunger 41 whose upper surface is shaped to the desired contour of the lower end of the capsule, and frictionally held inside the bore of the mold by packing material in the form of rubber or similar O-ring 42. The position of plunger 41 in the mold is adjusted to the desired size of the capsule. A downwardly projecting rod 43 is adapted to be engaged in discharge station 25 by discharge plunger 44, (Fig. 1) which pushes mold plunger 41 upwardly through the mold and discharges the capsule. In this position the mold is engaged by a retaining member 45 which prevents elevation of the mold during the discharge operation.

Following discharge of the capsule from the mold, and at some point between discharge and filling position 11 (see Fig. 2), plunger 41 is moved down in the mold to the position desired for filling by a setting plunger 48 actuated by mechanism presently described. This mechanism is adjustable so as to move the plunger 41 to a position in the mold determined by the desired size of the capsule. Plunger 41 retains its adjusted position by the friction of its packing 42 with the sides of the mold. Plunger 48 is located to register with successive molds each time the turret comes to rest for successive filling and discharge operations. In other words, filling, discharge and return of the plunger 41 to filling position take place simultaneously at different stations in the cycle of travel of the successive molds.

The mold filling device is here shown in the form of a compound nozzle 51 (see Fig. 4) comprising an outer tube 52 for the shell material and a concentric inner tube or nozzle 53 for the content or capsule fill material. The discharge end of the latter nozzle is preferably held concentric or coaxial with tube 52 by a plurality of small fins 54 (see Fig. 2) to insure a uniform distribution of the shell material around the content material as it is discharged into the mold. The thickness of the shell is regulated by the wall thickness and the annular stream of shell material. The cooling action of the filling material on contacting with the annular stream of shell material assists in maintaining uniform shell thickness.

The shell material is advantageously supplied from reservoir 57 connected with tube 52 by line 58. One appropriate shell material comprises:

| | Percent |
|---|---|
| Gelatin | 25–33 |
| Glycerin | 25–15 |
| Water | 50–52 |

Any other composition heretofore used for capsule shells may be employed, e. g., paraffin wax, chocolate, etc. In the event it may be necessary for a given shell material, the mold surfaces may be lubricated to prevent adhesion of the shell material thereto. Lubricant, e. g., purified mineral oil, may advantageously be applied by the mold bottom resetting plunger 48 or any other device.

The charge of shell material is determined by a metering device in the form of a variable stroke plunger 59 which forces the predetermined charge from plunger cylinder 60 to line 58, displacing a like charge from the end of the nozzle. A valve 61 operated in synchronism with plunger 59 closes connection with reservoir 57 during the charging operation to compel the charge to pass into line 58 and toward nozzle 52. The reservoir discharges by gravity (or, if the valve be open, by the suction of plunger 59) into cylinder 60 through line 62.

The variable stroke plunger operating mechanism is here represented by a variable arm bell crank 63 fulcrumed at 64 and operated by a grooved or side face cam 65 rotated by shaft 66 in synchronism with removement of the turret. The arm 67 of the bell crank is formed on an arc the center of which is the point of connection 68 of the connecting rod 69 with plunger 59. Adjustment of effective arm length and plunger stroke may thus be made without disturbing the timing or phase of plunger operations. Connecting rod 69 is provided with a pivoted slide 70 slidable over arm 67 and adapted to be clamped by a set screw 71 or the like in adjusted position on arm 67. The effective length of the latter is therefore variable and correspondingly varies the length of the plunger stroke and the volume of shell material discharged into the mold.

A similar adjustable stroke bell crank is employed for operation of each of plungers 44 and 48 driven by means synchronized as aforesaid with the operation of the turret (see Fig. 1).

Valve 61 is opened and closed in synchronism with the operation of plunger 59 by connecting rod 73 pivoted to the valve operating handle 74. Any appropriate mechanism may be employed for actuating connecting rod 73 in synchronism with the operation of plunger 59.

The content or filling material is advantageously supplied from a similar reservoir 78 discharging by gravity and/or suction of plunger 80 into plunger cylinder 79 and discharged from the latter by adjustable stroke metering plunger 80. A two-way valve 81 controls supply line 82 and discharge of plunger cylinder into line 83 leading to nozzle 53. The volume of the content material is adjusted and varied by a variable stroke bell crank 84 pivoted at 85 and similar in nature and operation to bell crank 63. Operation is effected by a side face grooved cam 86 actuated in synchronism with the operation of the turret as aforesaid. Valve 81 is synchronously operated by connecting rod 87 pivoted to the valve operating handle 88. Connecting rod 87 may be actuated by the same or similar mechanism as that employed to actuate metering plunger 59.

Plunger 59 is operated to continue discharge of shell material momentarily after interruption of flow of fill material, to assure sealing of the capsule and complete enclosure of the content material at the top of the capsule. For some types of content material, particularly those of a viscous or stringy nature, a sharp cutting off of the column of fill material at the nozzle tip is facilitated (and drawing out of a thread of the material prevented) by a slight drawing or sucking back of the column of fill material from the tip of nozzle 53 at the end of the filling operation. This is advantageously effected in the present instance by a short and quick partial return stroke of plunger 80 (while valve 81 still connects cylinder 79 with the nozzle) which quickly draws back the column of material from the tip of nozzle 53, insuring a sharp break of the column and preventing drawing out of the material into a thin thread. In the present instance this is effected by momentarily placing plunger 80 under the control of lever 91 pivoted at 92 and actuated by spring 93 to give the lever a short return stroke whose length is determined by the setting of limit screw 94. Spring 93 (being under tension) tend to retract plunger 80 until its movement is arrested by engagement of limit screw 94 with stop 95. The spring is adequately tensioned and lever 91 rotated in a clockwise direction by the discharge movement of plunger 80 under the driving force of cam 86. The cam groove is given a sharp break at 96 so timed that the roller 97 on bell crank 84 reaches the break at the time it is desired to sever the column of fill material. At this point the bell crank lever 84 is free and momentarily offers no resistance to the retracting pressure of lever 91, thus allowing the latter to retract plunger 80 a very short distance (determined by the setting of screw 94) so as sharply to break the column of fill material as aforesaid. This operation is helpful but not necessary for the nonviscous and relatively free-flowing fill materials.

In the illustrative method employing a gelatin shell, the gelatin is maintained in fluid condition by heat and is set or hardened by cooling. For that purpose reservoir 58 is provided with a heating jacket 99 enclosing a space 100 for the circulation of heating fluid. The latter is heated by a thermostatically controlled heater 101 in reservoir 102 and circulated by a pump here shown in the form of a motor driven impeller 103. Heater 101 may advantageously be electrically heated and controlled by thermostat 104. For gelatin shell materials the temperatures may advantageously be 110° F. to 150° F., but these temperatures should not be regarded as limits, since the optimum temperature depends on the composition and thickness of the capsule shell. The reservoir is connected with the heating jacket by supply and return lines 105 and 106. Preferably both the plunger cylinder 60 and supply line 58 are provided with heating jackets 107 and 108 (connected in the heating fluid circuit) to prevent premature congealing of the gelatin and to maintain it in its fluid condition at the point of discharge into the mold. Line 109 connecting jacket 108 with reservoir jacket 99 completes the circuit.

To assist in congealing and hardening of the gelatin shell in the mold, the capsule fill material is advantageously cooled, and the supply lines similarly cooled to maintain it in an adequately cool condition upon introduction into the mold. Thus the shell material is cooled both by the cooled content material on the interior of the shell and the cooled mold surfaces on the exterior. Rapid hardening of the gelatin shell greatly improves the speed of operation and the capacity of the apparatus.

The cooling apparatus is here shown in the form of a cooling jacket 111 surrounding reservoir 78 and connected with supply and return lines 112 and 113 with a cooling reservoir 114. The latter is here shown provided with a cooling coil 115 preferably electrically controlled by thermostat 116 to maintain the desired temperature. Circulation is insured by pump here shown in the form of a rotary impeller 117. In the present instance the plunger cylinder 79 is provided with a cooling jacket 118 and supply line 83 with a cooling jacket 119 connected in series in the cooling circuit. Return is effected through line 120. Cooling jacket 111 is separated from the jacket 118 by a wall 121 to prevent short-circuiting of circulation of the cooling medium and insuring adequate circulation through the remote portions of cooling jackets.

Figs. 2 and 3 have been provided with legends which explain the successive steps in the method without the necessity of detailed explanation. At the beginning of the mold filling operation, the adjustment of the mold lowering mechanism (Fig. 3) is advantageously regulated to position the mold so that its bottom is close enough to the tip of the nozzle to prevent occlusion of air in the capsule or between the capsule and the mold wall. For gelatin, this spacing is about $\frac{3}{16}$ of an inch or less. During filling, the rate of lowering of the mold should correspond with the rate of filling so that the aforesaid spacing is not exceeded, otherwise air may be occluded. Yet the rate of mold fall must be rapid enough to prevent shell and fill materials from piling up between the nozzle and the mold. Upon interruption of discharge of fill material from the nozzle, the mold is preferably lowered so that it is about ¼ inch below the tip of the nozzle to allow adequate space for the flow of the remaining shell material which is supplied to cover the top of the capsule.

The curved adjusting arms 26, 63 and 84 prevent change in phase of the mold lowering and filling operations despite variation in capsule length and extent of mold lowering movement.

It will be understood that the turret type of apparatus is merely illustrative and represents a means for carrying a mold through the successive steps of the method. It will also be understood that the invention is not limited to specific content or shell material, or to those hardened in a manner similar to the hardening of the gelatin shell. Nor is it limited to a turret type of apparatus. Other mechanisms for presenting molds in succession to filling position may be employed.

Furthermore, a plurality of filling nozzles and filling stations may be employed for the simultaneous filling of a plurality of molds.

Obviously the invention is not limited to the details of the illustrative method and apparatus, since these may be variously modified. Moreover, it is not indispensable that all features of the invention be used conjointly, since various features may be used to advantage in different combinations and sub-combinations.

Having described my invention, I claim:

1. Apparatus for making capsules comprising in combination a mold, mold filling means including concentric nozzles for delivering a tubular stream of fluid shell material surrounding an interior stream of fluid fill material into said mold, variable stroke plungers for metering and delivering metered charges of shell and fill material to said nozzles respectively, and mechanism for causing the fill material plunger to make a quick retracting movement at the end of its delivery stroke independently of the movement of said shell material plunger to break the stream of fill material sharply.

2. The method of forming capsules which comprises heating a tubular stream of liquid thermoplastic material in such fluid condition as to flow by gravity into a mold, simultaneously feeding capsule filling material in similar fluid condition into said mold inside said stream of shell material, cooling said mold and said fill material to congeal the shell material to non-fluid condition as it assumes its position in the mold whereby to prevent the shell material from settling in the mold and to maintain a uniform shell thickness, lowering the mold at the rate the latter is filled by said stream, interrupting feed of fill material before interruption of feed of shell material so as to provide shell material in fluid condition to flow over and seal the end of the capsule over the fill material with a seamless shell, and after the shell material has hardened, discharging the capsule from the mold.

3. The method of forming capsules which comprises feeding a tubular stream of liquid shell material into a mold in such fluid condition as to flow by gravity therein, simultaneously feeding a stream of capsule filling material in similar fluid condition into said mold inside said stream of shell material, commencing the feed of shell material momentarily before that of the fill material to insure covering the bottom of the mold with shell material, and continuing the supply of shell material without interruption so that the capsule shell is seamless around the bottom and sides of the mold, interrupting and quickly drawing back said stream of fill material before interruption of the feed of shell material to insure complete covering of the fill material at the top of the mold with a shell integral and seamless with the shell at the sides of the capsule, and to insure sharp severing of said fill material, and after hardening of the shell material in the mold discharging the capsule from the mold.

4. Apparatus for forming capsules comprising in combination a cylindrical mold, a pair of concentric nozzles for delivering concentric streams of liquid shell and fill material to said mold, adjustable means for predetermining the volume of shell and fill materials discharged into said molds, and an adjustable slidable bottom in said mold having a frictional engagement with the wall of the mold sufficient to hold the bottom in the mold, the position of said bottom in the mold being adjusted to correspond with the volume of shell and fill material discharged into the mold by said predetermining means, means for moving the bottom in the mold to discharge a molded capsule, and means for returning the bottom to a predetermined position in the mold prior to a mold filling operation.

5. Apparatus for forming capsules comprising in combination a cylindrical mold, a pair of concentric nozzles for delivering in concentric streams metered charges of liquid shell and fill material to said mold, means for metering said charges, a slidable bottom in said mold, means for moving the bottom in the mold to discharge a molded capsule, and adjustable means for returning the bottom of the mold to a predetermined position in the mold and for varying the effective volume of the mold.

6. Apparatus for forming capsules comprising in combination a cylindrical open top mold, a pair of concentric nozzles for delivering in concentric streams metered charges of fluid shell and fill material to said mold, means for delivering said metered charges to said nozzles, means for supporting said mold so as to be vertically movable below said nozzles, and means for quickly lowering said mold at the end of the mold filling operation so as sharply to break the stream of shell material.

7. Apparatus for forming capsules comprising in combination a cylindrical open top mold, a pair of concentric nozzles for simultaneously delivering metered charges of liquid shell and fill material to said mold, means for delivering said metered charges to said nozzles, means for supporting said mold so as to be vertically movable below and relative to said nozzles, mechanism for raising the mold to filling position and for lowering it to discharge position, a discharge plunger for discharging the molded capsule out of the top of the mold, and means for holding the mold against raising during the discharging operation.

8. The method of forming capsules which comprises feeding a tubular stream of liquid thermoplastic shell material from a nozzle in such fluid condition as to flow by gravity into contact with the walls of a mold, cooled to temperatures adapted to harden the shell material whereby the shell material in its fluid condition conforms to and is confined by the walls of the mold, simultaneously feeding from said nozzle capsule filling material in similar fluid condition into said mold inside said nozzle of shell material, relatively separating said stream and mold as the latter fills, interrupting feed of fill material before interruption of feed of shell material so as to provide shell material in fluid condition to flow over and seal the end of the capsule over the fill material with a seamless shell, and after the shell material has hardened, discharging the capsule from the mold.

9. The method of forming capsules which comprises heating a supply of thermo-plastic shell material to maintain it in such fluid condition as to flow by gravity into a mold, feeding a predetermined charge of shell material in liquid condition into the mold in a tubular stream, cooling the mold to congeal the shell material after contact thereof with the walls of the mold to prevent its settling in the mold, feeding a predetermined charge of fill material into said mold on the interior of said tubular stream, feeding of the latter material commencing after and terminating before the commencement and termination of feed of said shell material to insure complete covering of said fill material by a seamless covering of said shell material, and at the termination of feed of said fill material momentarily quickly reversing the flow of fill material independently of said shell material to break the stream of the latter sharply, and discharging the capsule from the mold after congealing of said shell material.

References Cited in the file of this patent

UNITED STATES PATENTS

| Number | Name | Date |
|---|---|---|
| 458,754 | Hoffman | Sept. 1, 1891 |
| 1,391,974 | Phillips | Sept. 27, 1921 |
| 1,650,981 | Crouch | Nov. 29, 1927 |
| 1,654,647 | Heist | Jan. 3, 1928 |
| 1,758,946 | Grupe | May 20, 1930 |
| 1,858,956 | Hepperle | May 17, 1932 |
| 1,970,396 | Scherer | Aug. 14, 1934 |
| 2,080,783 | Petersen | May 18, 1937 |
| 2,205,837 | Ravenscroft et al. | June 25, 1940 |
| 2,217,335 | Eden | Oct. 8, 1940 |
| 2,244,750 | Weisenberg | June 10, 1941 |
| 2,323,581 | Weckesser | July 6, 1943 |
| 2,331,572 | Scherer | Oct. 12, 1943 |
| 2,333,433 | Mabbs | Nov. 2, 1943 |
| 2,350,971 | Pecker | June 6, 1944 |
| 2,379,816 | Mabbs | July 3, 1945 |
| 2,428,911 | Gunnell | Oct. 14, 1947 |
| 2,436,439 | Lincoln et al. | Feb. 24, 1948 |